(12) United States Patent
Kreischer et al.

(10) Patent No.: US 9,766,118 B2
(45) Date of Patent: Sep. 19, 2017

(54) METHOD AND DEVICE FOR MONITORING VIBRATIONS OF THE WINDING OVERHANG IN A GENERATOR

(75) Inventors: Christian Kreischer, Oberhausen (DE); Timot Veer, Duisburg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 444 days.

(21) Appl. No.: 14/232,928

(22) PCT Filed: Jul. 12, 2012

(86) PCT No.: PCT/EP2012/063663
§ 371 (c)(1),
(2), (4) Date: Feb. 27, 2014

(87) PCT Pub. No.: WO2013/010903
PCT Pub. Date: Jan. 24, 2013

(65) Prior Publication Data
US 2014/0174185 A1  Jun. 26, 2014

(30) Foreign Application Priority Data

Jul. 20, 2011  (EP) .................................... 11174658

(51) Int. Cl.
*G01H 1/14* (2006.01)
*G01H 1/00* (2006.01)

(52) U.S. Cl.
CPC ............... *G01H 1/14* (2013.01); *G01H 1/006* (2013.01)

(58) Field of Classification Search
CPC .................................. G01H 1/14; G01H 1/003
USPC ..................................... 73/587, 588
See application file for complete search history.

(56) References Cited

U.S. PATENT DOCUMENTS

| 4,975,855 | A | * | 12/1990 | Miller | .................... | G01H 1/003 340/680 |
|---|---|---|---|---|---|---|
| 5,146,776 | A |  | 9/1992 | Twerdochlib et al. | | |
| 5,520,061 | A | * | 5/1996 | Thibault | ................ | G01H 1/003 73/579 |
| 6,779,404 | B1 | * | 8/2004 | Brincker | ............. | G01M 5/0066 73/659 |
| 8,186,223 | B2 | * | 5/2012 | Dawson | ................ | G01M 15/12 73/587 |
| 2004/0243332 | A1 |  | 12/2004 | Shen et al. | | |
| 2005/0072234 | A1 |  | 4/2005 | Zhu et al. | | |
| 2010/0242609 | A1 | * | 9/2010 | Lee | ..................... | G01M 5/0008 73/594 |

FOREIGN PATENT DOCUMENTS

| EP | 1 780 885 A1 | 5/2007 |
|---|---|---|
| KR | 10-2011-0034281 A | 4/2011 |

OTHER PUBLICATIONS

Kreischer et al. "Modal Analysis of Operational End Winding Vibrations", 2011 IEEE International Electric Machines& Drives Conference, date of Conference May 15-18, 2011.*

(Continued)

*Primary Examiner* — Paul West
*Assistant Examiner* — Xin Zhong
(74) *Attorney, Agent, or Firm* — Ostrolenk Faber LLP

(57) ABSTRACT

A method for monitoring vibrations of the winding overhang in a generator (2) comprises the following steps: —detection of vibrations of the winding overhang (15) during the operation of the generator; —transformation of signals of the vibrations into the frequency range; —transformation of multiple individual vibrations from the frequency signals into the modal range; and —determination of deviations of the modal forms and/or individual bar vibrations in relation to a reference response.

15 Claims, 2 Drawing Sheets

(56) References Cited

OTHER PUBLICATIONS

Notice of Preliminary Rejection dated Jan. 31, 2015 in corresponding Korean Patent Application No. 10-2014-7004048 with English language translation (9 pages).
Search Report dated Apr. 24, 2012 issued in corresponding European Patent Application No. 11174658.2.
Humer et al. "Monitoring of generator end winding vibrations", Proceedings of the 2008 International Conference on Electrical Machines, Paper ID 803; ISBN 978-1-4244-1736-0/08, pp. 1-5 (2008).
Kreischer et al. "Modal Analysis of Operational End Winding Vibrations", 2011 IEEE International Electric Machines & Drives Conference (IEMDC), ISBN 978-1-4577-0061-3/11, pp. 1207-1212 (2011).
Christian Kreischer "Monitoring and Diagnose von Wickelkopfschwingungen in Kraftwerksgeneratoren [Taschenbuch]". XP-002671462 ( May 31, 2011.) English translation of the brief description (total 4 pages) http://www.amazon.de/Monitoring-Diagnose-von-Wickelkopfschwingungen-Kraftwerksgeneratoren/dp/3868539204.
International Search Report dated Aug. 2, 2013 issued in corresponding International patent application No. PCT/EP2012/063663.
Written Opinion dated Aug. 2, 2013 issued in corresponding International patent application No. PCT/EP2012/063663.

* cited by examiner

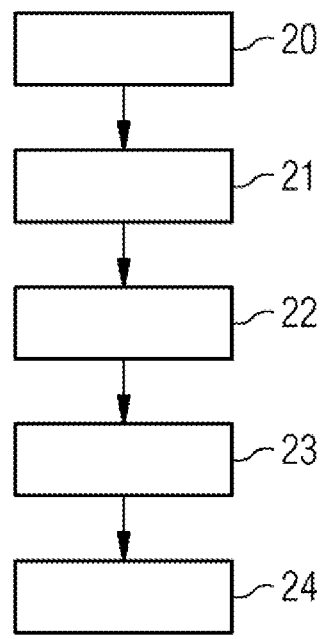
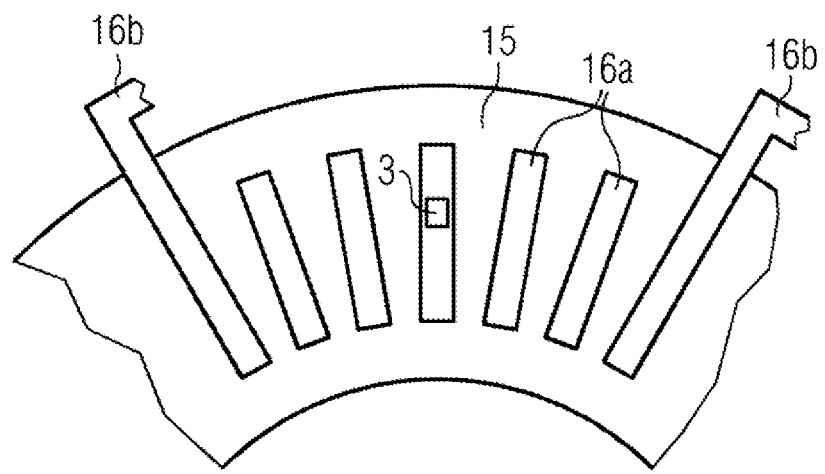

METHOD AND DEVICE FOR MONITORING VIBRATIONS OF THE WINDING OVERHANG IN A GENERATOR

CROSS REFERENCE TO RELATED APPLICATIONS

The present application is a 35 U.S.C. §371 national phase application based on PCT/EP2012/063663, filed Jul. 12, 2012, which claims priority of European Patent Application No. 11174658.2, filed Jul. 20, 2011, the contents of both of which are incorporated in full by reference herein. The PCT International Application was published in the German language.

FIELD OF THE INVENTION

The invention relates generally to a method and a device for monitoring vibrations of the winding overhang in a generator, in particular a power plant generator.

BACKGROUND

The winding overhangs of power plant generators are excited to vibrate during operation and during electrical faults. Excessively high vibrations can lead to damage to the winding overhangs, and may destroy the generator.

Hitherto, the state of a winding overhang in the generator has been determined by bump tests, which are complicated to perform. To this end, the generator to be examined has to be stopped, the cooling gas evacuated and the generator opened. With this method, the eigenfrequencies and eigenmodes of the winding overhang can be determined well. However, these frequencies shift during operation because of the operating temperatures, which is disadvantageous. Thus, an assessment of the condition of the winding overhang can be carried out economically only at relatively large time intervals. Continuous recording of the winding overhang vibrations at discrete positions is already carried out on individual winding overhangs, however suitable methods for evaluation are lacking.

SUMMARY OF THE INVENTION

The object of the invention is to improve the monitoring of winding overhang vibrations.

A method according to the present invention includes monitoring vibrations of the winding overhang in a generator, comprising the following steps:
  detection of vibrations of the winding overhang during the operation of the generator;
  transformation of signals of the vibrations into the frequency range;
  transformation of multiple individual vibrations from frequency signals into the modal range; and
  determination of deviations of the modal forms in relation to a reference response.

Optionally, a signal analysis can additionally be carried out with regard to system faults, in order to permit a sensor check.

Monitoring and diagnosis of the vibrations during operation that are tailored to a winding overhang is made possible with a method according to the present invention. Through modal transformation, the items of vibration information from multiple winding overhang positions can be combined with one another, and new assessment criteria tailored to the winding overhang can be defined. The modal transformation permits rapid, reliable and simple analysis of the vibration response of the winding overhang. The modal forms can be compared with a learned, operation-dependent reference response which, for example, can be depicted by a trained neural network, numerical regression based on historical data or further methods for simulating the vibration response. The modal form can be determined by mathematical methods such as, for example, a Riemann sum, adaptation in accordance with the least square error method, a polygon, spline interpolation and/or Bessel functions, etc. Additionally, individual rod vibrations of winding rods or control rods in the generator can be considered.

Operating parameters of the generator, such as active power, reactive power and/or temperature, can be detected. Important operating parameters, such as active power, reactive power and/or temperature (for example of the cooling gas) in the vicinity of the winding overhang are detected by measurement and made available for analysis. The measured data can be highly time-resolved and recorded continuously. During the determination or the analysis of the deviations in relation to a reference response, the operating parameters of the generator are taken into account, so that deviations can be considered separately, irrespective of the operational states.

Signals of the vibrations and/or the operating parameters can be checked and/or stored. The signals relating to the variations in vibration over time and to the operating parameters can be checked for plausibility and stored regularly or continuously (e.g. ring buffer on site) for subsequent assessment. In addition to absolute limiting values, the time derivatives of the signals can also be considered. Provision can be made for the next step of the transformation into the frequency domain to be performed only in the case of valid signals. This increases the reliability and the efficiency of the method and improves the results of the modal transformation.

Measured signals of the vibrations and/or the operating parameters can be reduced, checked and/or stored. In addition, the frequency spectra can be checked for their plausibility. This is primarily done by considering the first two speed-harmonic vibration components and the sum of all the other frequency components. A correlation with operating parameters can be tested. Preferably, a correlation with operating parameters is always tested. By subsequent consideration of the important frequency components and the residual value (sum of the remaining frequency components), data reduction may be achieved. The reduced datasets can likewise be stored for more thorough assessments and subjected to sensor and/or signal validation.

The transformation into the modal range can be carried out in multiple measuring planes. If the modal transformation is applied to multiple winding overhang planes, the vibration response can be analyzed three-dimensionally, which improves the analysis.

The modal forms and/or the deviations thereof can be subjected to a limiting value consideration which, if appropriate, outputs warnings and alarms for the assessment by an expert or an expert system.

The modal forms can be subjected to a trend observation which, if appropriate, outputs warnings and alarms for the assessment by an expert or an expert system. The trend observation assesses absolute values as well as abrupt or unusually fast changes in magnitude and orientation of the modal forms.

Characteristic values of the modal forms can be fed to a counter. For the consideration of the incremental service life consumption, the characteristic values of the modal forms are fed to one or more counters. The counters record the detected stresses, primarily as a result of operating faults, and, in this way, permit statements to be made about the aging of the winding overhang. Since transient compensating processes as a result of faults in the network decay rapidly, the vibration data can be evaluated with high resolution and continuously for this purpose. In the event of faults with transient compensation processes being detected, the time signals from a ring buffer can be stored permanently and analyzed in more detail.

For the determination of stresses as a result of operating faults (network defects, brief interruptions, lack of synchronization and so on), a continuous evaluation can be carried out. The transformation into the frequency range can be based, for example, on short time intervals up to 320 ms.

The consideration of trends, limiting values and deviations can be carried out both in the time range and in the frequency range.

Based on the modal forms, the stored signals and/or the stored frequency signals, an assessment of the winding overhang vibrations can be performed. Therefore, a method according to the present invention goes beyond pure monitoring and diagnosis, and an assessment or recommendation, for example, with regard to improved or optimal operating parameters or the service life of the winding overhang or the generator, can be provided.

A device according to the present invention is configured for monitoring vibrations of the winding overhang in a generator and includes at least one vibration sensor for detecting vibrations of the winding overhang and an evaluation unit for evaluating signals from the sensor, wherein the evaluation unit has a modal transformer for the transformation of multiple individual vibrations of the signals into the modal range and a comparator for the determination of deviations of the modal forms in relation to a reference response. The same advantages and modifications as described for the method apply to a device according to the present invention.

The sensor can preferably be a fiber-optic acceleration or vibration sensor or a piezoelectric sensor. These sensor types supply reliable signals and are simple to install.

The sensors can be arranged centrally between two winding or control rods in the generator. Alternatively, the sensors can be arranged off-center or directly on the rods.

Further sensors for the detection of operating parameters of the generator, such as active power, reactive power and/or temperature, can be arranged in the vicinity of the winding overhang and connected to the evaluation unit. This permits a comprehensive analysis while taking the respective operating state into account.

The comparator can have a selection device for the selection of the reference response on the basis of the operating variables. Therefore, the reference response can be selected in accordance with the operating situation, which improves the accuracy of the monitoring.

The invention will be described in more detail below by using the following Figures.

BRIEF DESCRIPTION OF THE FIGURES

FIG. 2 shows a flowchart of a method for monitoring vibrations of the winding overhang in a generator according to the invention.

FIG. 3 shows a schematic representation of the placing of sensors on the winding overhang of a generator.

The drawings serve merely to explain the invention and do not restrict the latter. The drawings and the individual parts are not necessarily to scale. The same designations designate the same or similar parts.

DETAILED DESCRIPTION

Figure 1:
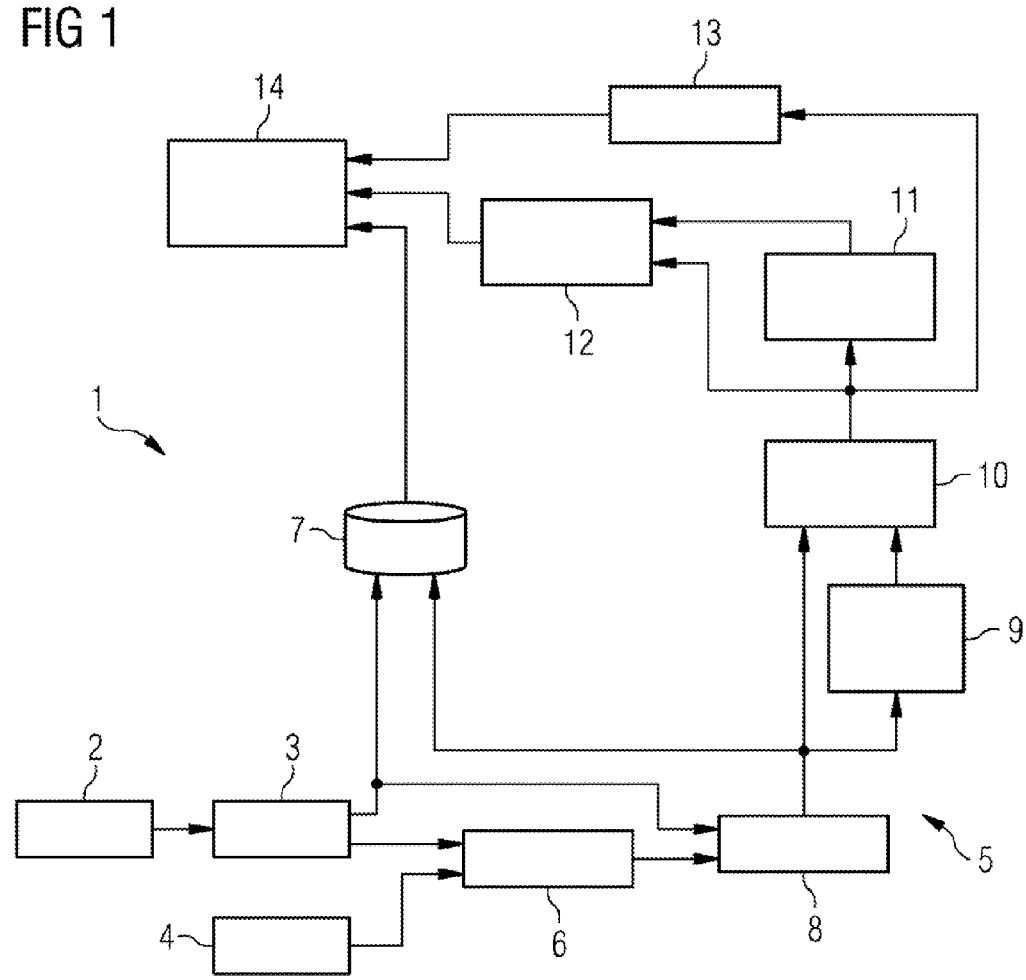
FIG. 1 shows a schematic representation of a device for monitoring vibrations of the winding overhang in a generator according to the invention.

FIG. 1 shows a device 1 for monitoring vibrations of a winding overhang in a generator 2. A sensor 3, for example, a vibration sensor or acceleration sensor, for example, in the form of a fiber-optic acceleration or vibration sensor or a piezoelectric sensor, picks up vibrations of the winding overhang or part of the winding overhang or other component parts of the generator 2 which are located in the vicinity of the winding overhang, such as, for example, winding rods or control rods. For example, six sensors 3 can be distributed in a radial orientation over the circumference of the winding overhang.

Further sensor systems or sensors 4 detect operating parameters of the generator, such as active power, reactive power and/or temperature in the vicinity of the winding overhang (e.g. of the cooling gas).

The sensors 3 and 4 are connected to an evaluation unit 5 of the device 1. Firstly, the sensors 3 and 4 are connected to a signal validation means 6, in which all or selected signals from the sensors 3 and 4 are checked for plausibility. Here, inter alia, constancy, limiting values and noise of the signals are examined. Signal pre-processing can likewise be performed, in which, for example, noise is suppressed and/or signal levels are adapted. Non-plausible signals are discarded, corrected if possible and/or an error message or warning is output. Plausible or valid signals are passed on.

The sensors 3 and 4 are also connected to a memory 7 for the device 1. This can be, for example, a ring buffer, which stores or buffers the raw data from the sensors 3 and 4. The storage can be carried out continuously or at intervals. If appropriate, in the case of detected faults with transient compensating processes, the time signals from a ring buffer can be stored permanently and analyzed in more detail.

The signal validation means 6 is connected to a conditioning means 8, in which the valid signals are further conditioned by means of a transformation into the frequency range, for example by means of a Fourier transformation. By means of a subsequent consideration of the important frequency components and the residual value (sum of the remaining frequency components) data reduction is carried out. The reduced data sets are likewise stored in the memory 7 for more thorough assessments and fed to a sensor and signal validation means 9.

Here, too, the signals are checked for validity. Non-plausible signals are discarded, corrected if possible and/or an error message or warning is output. Plausible or valid signals are passed on to a modal transformer 10. The unprocessed signals from the conditioning means 8 are likewise fed to the modal transformer 10 and the following components.

The modal transformer 10 transforms multiple individual vibrations of the valid signals into the modal range. In the modal range, a reliable and meaningful evaluation of the signals can be performed, inter alia by using eigenvalues and/or eigenfrequencies.

The signals in the modal range are evaluated for several types. The signals are fed to a comparator or deviation calculation means 11, in which the deviations of the operating parameter-dependent modal forms relative to a reference response are determined (e.g. by means of neural networks). The reference response is selected or adapted on the basis of the operating parameters, in order to achieve an accurate deviation while taking the operating state into account. To this end, the comparator 11 can contain a selection device which selects an appropriate reference response as a function of one or more signals from the operating parameters. An additional analysis is the trend observation, which assesses abrupt or unusually fast changes in magnitude and orientation of the modal forms.

The modal forms and the deviations thereof are then fed to a limiting value consideration means 12, where the signals and/or the deviations thereof (obtained from the comparator 11) are examined with regard to their limiting values.

Furthermore, the modal forms are fed to one or more counters 13 to consider the incremental service life consumption. The counters record the detected stresses, primarily as a result of operating faults and, in this way, permit statements to be made about the aging of the winding overhang. Since transient compensating processes as a result of faults in the network decay rapidly, it is necessary to evaluate the vibration data with high resolution and continuously for this purpose.

The limiting value consideration means 12, the counter 13 and the memory 7 are connected to an evaluation unit 14, in which the results are processed. The evaluation unit 14 can contain an expert system or output pointers, warnings and alarms for the assessment by an expert or an expert system. This can be, for example, a pointer to the remaining service life of the winding overhang, the current vibrations, a warning in the event of dangerous operation or an emergency shutdown.

The evaluations of the signals in the modal range can proceed as illustrated or proceed only partly or in parallel. Likewise, the counter 13 can be arranged after the limiting value consideration means 12, or the comparator 11 can have a direct connection to the evaluation unit 14.

The evaluation unit 5 can comprise all the elements illustrated in FIG. 1, apart from the generator 2 and the sensors 3. The evaluation unit 5 comprises at least the conditioning means 8, the modal transformer 10 and the comparator 11.

In FIG. 2, a flowchart of a method for monitoring vibrations of the winding overhang in the generator 2 is shown.

In a first step 20, vibrations of the winding overhang during the operation of the generator 2 are detected. In addition, operating parameters of the generator, such as active output, reactive output and/or temperature, can be detected. The signals of the vibrations are transformed into the frequency range in a second step 21. Optionally, this can be done only when signals of the vibrations and/or the operating parameters have been checked and/or stored.

In a third step 22, multiple individual vibrations are transformed from frequency signals into the modal range. The transformation into the modal range can be carried out in up to three measurement planes in the present exemplary embodiment, which permits a three-dimensional examination. Optionally, the transformation can be done only when frequency signals of the vibrations and/or the operating parameters have been reduced, checked and/or stored.

In a fourth step 23, the modal forms and/or individual rod vibrations are evaluated, for example by determining deviations of the modal forms and/or individual rod vibrations in relation to a reference response, by considering limiting values of the modal forms and/or individual rod vibrations and/or the deviations thereof, by means of a trend observation of the modal forms and/or individual rod vibrations and/or by feeding characteristic values of the modal forms and/or individual rod vibrations to a counter.

In a fifth step 24, on the basis of the modal forms, the stored signals and/or the stored frequency signals, an assessment of the winding overhang vibrations can be performed. This assessment or an alarm can be output to an expert or an expert system, or direct interventions, such as an emergency shutdown, can be provided.

FIG. 3 shows, schematically, a detail from a front side of a winding overhang 15 in a generator 2. A sensor 3 for detecting vibrations of the winding overhang 15 is arranged centrally between two control rods 16*b* in the generator 2, on a winding rod 16*a*.

This exemplary embodiment of a winding overhang 15 is, by way of example, the equipment relating to a 2-pole generator having six sensors 3 in the form of fiber-optic vibration sensors arranged on the end connections and in the radial direction, wherein the sensors 3, when applied to the control side, are in each case arranged as centrally as possible in a coil group between two control rods 16*b* and are mounted on a rod. In addition to the vibrations, the operating parameters active output, reactive output and cooling gas temperature in the vicinity of the winding overhang 15 are additionally picked up with high time resolution and continuously. The raw time data is subjected to a signal check, in order to detect possible faults in the measuring chains. For example, each hour the raw time data over sixteen periods of rotation of the rotor is stored. The valid signals are subsequently subjected to a Fourier transformation. The transformed data is validated and, for example, stored every minute. A modal transformation is then carried out. The modal forms are compared with a learned, operation-dependent reference response which, for example, can be depicted via a trained neural network. Both the absolute characteristic variables from the modal forms and/or individual rod vibrations and also the determined deviations are subjected to a limiting value consideration, which outputs warnings and alarms. The occasions on which limiting values are exceeded are also detected by a counter and summed. In this way, information relating to the state of aging of the winding overhang 15 is provided.

The invention claimed is:

1. A method for monitoring vibrations of a winding overhang in a power generator, comprising the following steps:
    detecting with a sensor vibrations of the winding overhang during operation of the generator;
    transforming vibration signals representative of the vibrations that are received from the sensor into a frequency range;
    transforming multiple individual vibration signals from the frequency range into a modal range;
    detecting a power generator operating parameter of the generator, the operating parameter including at least one of active power, reactive power and cooling gas temperature at the winding overhang;
    at least one of selecting and adapting a reference response based on the detected power generator operating parameter; and
    determining deviations of modal forms or individual rod vibrations in relation to the reference response based on vibration signals in the modal range.

2. The method as claimed in claim 1, further comprising checking and/or storing the vibration signals and/or the operating parameters.

3. The method as claimed in claim 1, wherein the vibration signals and/or the operating parameters are reduced, checked and/or stored.

4. The method as claimed in claim 1, wherein the transformation into the modal range and/or the individual rod vibrations is carried out in multiple measuring planes.

5. The method as claimed in claim 1, wherein the modal forms, and/or individual rod vibrations and/or the deviations thereof are subjected to a limiting value consideration.

6. The method as claimed in claim 1, wherein the modal forms and/or individual ones of the rod vibrations are subjected to a trend observation.

7. The method as claimed in claim 1, wherein characteristic values of the modal forms and/or individual ones of the rod vibrations are fed to a counter.

8. The method as claimed in claim 1, further comprising assessing vibrations of the winding overhang based on at least one of the modal forms, and/or the individual rod vibrations, the vibration signals and/or the stored frequency signals.

9. The method as claimed in claim 1, wherein a signal analysis is carried out with regard to system faults.

10. A device for monitoring vibrations of a winding overhang in a power generator, the device comprising:
    at least one vibration sensor configured to detect vibrations of the winding overhang;
    an evaluation unit configured to evaluate vibration signals from the sensor, the evaluation unit comprising:
    a modal transformer configured to transform multiple individual vibration signals of the vibration signals into a modal range;
    a selector configured to select or to adapt a reference response based on an operating parameter of the power generator, the operating parameter including at least one of active power, reactive power and cooling gas temperature at the winding overhang; and
    a comparator configured to determine deviations of the modal forms and/or individual rod vibrations in relation to the reference response.

11. The device as claimed in claim 10, wherein the sensor is a fiber-optic acceleration or vibration sensor, or a piezoelectric sensor.

12. The device as claimed in claim 10, wherein the sensor is arranged centrally between two winding rods or control rods (16b) in the generator.

13. The device as claimed in claim 10, further comprising:
    further sensors configured to detect operating parameters of the generator, the operating parameters including the operating parameter, and the further sensors are arranged at the winding overhang and connected to the evaluation unit.

14. The device as claimed in claim 13, wherein the selector is configured to select the reference response on the basis of a signal from at least one of the further sensors.

15. A device for monitoring vibrations of a winding overhang in a generator, the device comprising:
    at least one vibration sensor configured to detect vibrations of the winding overhang;
    an evaluation unit configured to evaluate vibration signals from the sensor, the evaluation unit comprising:
    a modal transformer configured to transform multiple individual vibration signals of the vibration signals into a modal range;
    a selector configured to select or to adapt a reference response based on an operating parameter of the generator, the operating parameter including at least one of active power and reactive power; and
    a comparator configured to determine deviations of the modal forms and/or individual rod vibrations in relation to the reference response.

* * * * *